Nov. 25, 1924.
J. C. WILLIAMSON
1,516,874
PLOWBEAM ATTACHMENT
Filed March 22, 1924
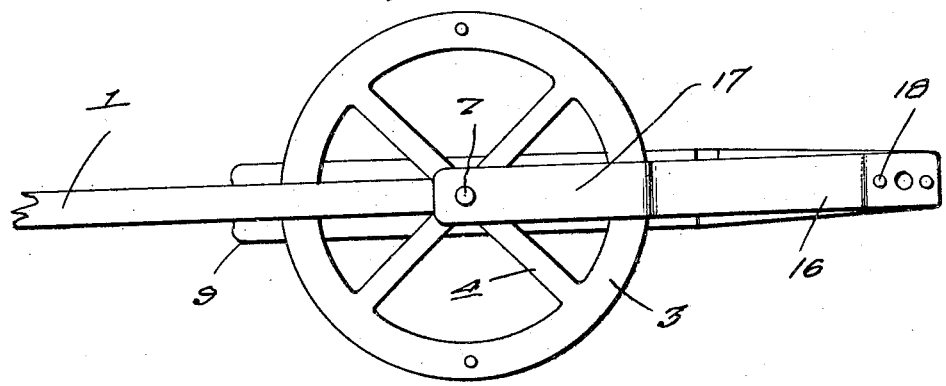
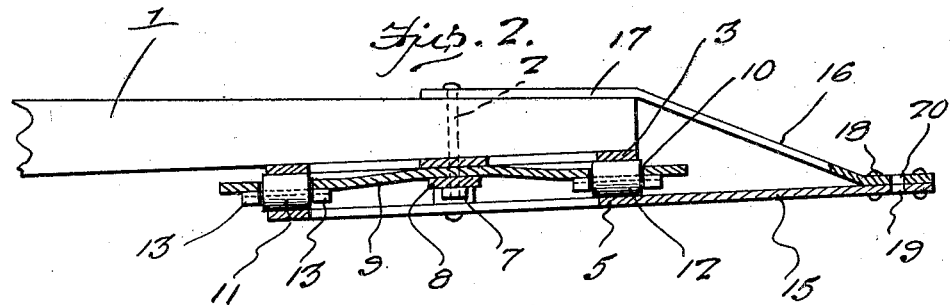
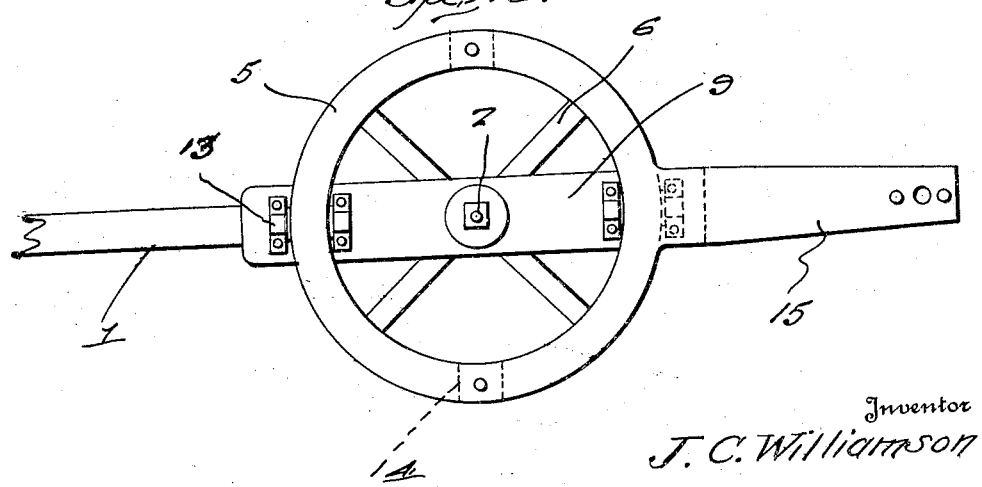
Inventor
J. C. Williamson
By Clarence A. O'Brien
Attorney Patented Nov. 25, 1924.

1,516,874

UNITED STATES PATENT OFFICE.

JASPER CARLTON WILLIAMSON, OF RANGE, ALABAMA.

PLOWBEAM ATTACHMENT.

Application filed March 22, 1924. Serial No. 701,169.

*To all whom it may concern:*

Be it known that I, JASPER CARLTON WILLIAMSON, a citizen of the United States, residing at Range, in the county of Conecuh and State of Alabama, have invented certain new and useful Improvements in Plowbeam Attachments, of which the following is a specification.

This invention relates to new and useful improvements for plow beams which are manually operated and has for its principal object to provide a means whereby the plow may efficiently operate in the soil regardless of the position that the draft horses connected thereto follow.

One of the principal objects of the present invention is to provide an attachment whereby the twisting of the plow whenever a turn is desired to be made is eliminated thus saving considerable time and labor in having to reset the shovel or plow shaft in the soil as now is necessary where the plow beam is connected at its forward end to a draft appliance.

A still further object of the invention is to provide an attachment of the above mentioned character, which will enable the horses to travel at a point away from the plow beam thus preventing any possibility of the animal from injuring any growing plant in the rows of which the plow is adapted to travel.

A further object of the invention is to provide a plow beam attachment of the above mentioned character, which is simple in construction, inexpensive, strong and durable, and further, well adapted for the purposes for which it is designated.

Other objects and advantages of this invention will become apparent during the course of the following description.

In the accompanying drawing forming a part of this specification, and in which like numerals designate like parts throughout the same, Figure 1 is a top plan view of my invention showing the same in position on the forward end of a plow beam, Figure 2 is a side elevation thereof with parts shown in section, and Figure 3 is a bottom plan view of the device.

In the drawing wherein for the purpose of illustration is shown the preferred embodiment of my invention, the numeral 1 designates a plow beam of the well known construction upon which is adapted to be supported in the usual manner, the plow share and handle and as the same forms no important feature of the present invention it is not thought necessary to illustrate or describe the same. Extending vertically through the plow beam 1 adjacent its forward end thereof is the bolt 2. Pivotally supported on the bolt 2 adjacent the bottom face of the plow beam 1 in a manner as clearly shown in Figure 2 of the drawing is the annular ring member 3. The same is preferably formed of sheet metal although it is to be understood that any other suitable material may be substituted therefor. Extending diametrically across the inner peripheral edges of the annular plate 3 are the strips 4 the intersecting portions of which are provided with a suitable opening for receiving the bolt 2.

Adapted to co-operate with the inner annular ring member 3 is a similar outer annular ring member 5 which is also formed of the same material and is provided with the cross strips 6 the intersecting portions of which are provided with an opening for receiving the lower end of the bolt 2 whereby the inner and outer annular ring members 3 and 5, respectively, will be in alinement with each other and are further adapted to be supported in spaced relation. To this end I provide the spacing member 7 on the upper portions of the intersecting strip 6 of the annular ring 5 and the washer 8 as shown in Figure 2 of the drawing.

Interposed between the inner and outer annular ring members 3 and 5, respectively, is the elongated strip 9. This strip 9 is provided with suitable openings 10 adjacent the outer ends thereof and adapted to extend through the openings 10 provided therein are the rollers 11 and 12, respectively. These rollers are mounted on suitable pins extending longitudinally therethrough and are supported at their ends in the brackets 12 and 13, respectively, secured to the bottom face of the strip 9 adjacent to the sides of each of the openings 10 in a manner as clearly shown in Figure 2 of the drawing. It will thus be seen that the rollers 11 and 12 respectively will engage the inner opposed faces of the outer portions of the annular ring members 3 and 5, respectively. The purpose of this arrangement will be hereinafter more fully described. The strip 9 is provided in its central portion with an opening whereby the same may be supported on the lower portion of the bolt 2. The strip 9 furthermore provides what may be termed as a floating intermediate member for the purposes of carrying out the objects of the present invention.

Suitable spacing members 14 are secured between the annular ring members 3 and 5, at diametrically opposite points in the manner as shown more clearly in Figure 3 of the drawing and provides a means for limiting the swinging movement or rotating movement of the annular ring members with respect to the intermediate floating strip 9.

Extending forwardly from the annular ring 5 and formed integrally therewith is the elongated bar or plate 15. The outer end of the bar or plate 15 is connected to the outer end of a similar bar or plate 16 the inner end of which extends over the top of the forward end of the plow beam 1 and is provided with an opening for co-operation with the upper end of the bolt 2 in the manner shown in Figures 1 and 2 of the drawing. The outer ends of the bars or plates 15 and 16 respectively, are secured together in any suitable manner, such as is shown at 18 and are provided with registering apertures 19 and 20, respectively, whereby a means is provided for securing the device to a whiffletree, doubletree or the like and which forms the draft connection for the plow beam so that the animals connected to the device may efficiently operate the plow when the latter is in use.

When the horses are pulling in a straight line with respect to the plow beam 1, the parts will be in the position as shown in Figure 1 of the drawing. When it is desired to make a turn, it is often experienced with the plows now in use, that the operator has to remove the plow from the ground so that the horses may be swung around and thereby prevent any possibility of the plows from twisting. He then must reset the plow in the ground before he can continue a cultivation of the soil. However, with a device of the above mentioned character, the loss of time and labor due to this is eliminated, and it will be readily seen that when the end of the row has been reached, and it is desired to enter the next adjacent row, the draft will swing around in such a manner as not to interfere with the twisting or removal of the plow from the soil, the swinging movement of the draft connection causing a simultaneous rotative movement of the annular rings 3 and 5 on the rollers 11 and 12 of the intermediate floating member 9.

By providing a plow beam attachment of the above mentioned character, the person operating the plow can control the position in which the plow share will follow in the ground and furthermore will prevent any possibility of the plow share from accidentally being moved out of the soil due to the lateral movement of the draft connected to the forward end of the plow. The simplicity of my device enables the same to be easily and readily attached in position on a plow beam of the construction well known in the art and does not require material alterations of parts now in position associated thereon.

Furthermore, the simplicity of my device enables the same to be manufactured at a minimum cost and may be readily disassembled whenever it is desired to replace the worn parts.

While I have shown the preferred embodiment of my invention, it is to be understood that various changes in the size, shape and arrangement of parts may be resorted to without departing from the spirit of the invention and the scope of the appended claims.

Having thus described my invention, what I claim is:—

1. A plow beam attachment comprising a plate secured to the forward end of said beam and adapted for rotary movement thereon, an additional plate carried by said aforementioned plate and spaced therefrom, a floating member interposed between said plates, rollers extending through openings provided in the ends of said floating member for engagement with the inner opposed faces of said plates, the outermost plate having an extension formed thereon extending beyond the forward end of said plate, and an arm pivoted at its inner end to the opposite side of said plow beam and co-operating with the extension on said outer plate providing a connection for a draft appliance.

2. A plow beam attachment comprising a bolt extending vertically through the forward end of said plow beam, an annular ring having cross strips providing a means for supporting said ring on the bottom face of said plow beam, said ring adapted for rotary movement thereon, an additional annular ring member carried by said before mentioned annular ring member and arranged in spaced relation thereto, a floating strip supported on said bolt and interposed between said spaced annular ring members, a pair of rollers extending through openings provided in the ends of said strip and adapted for engagement with the inner opposed faces of said annular ring members, the outer ring member having a plate extending therefrom forwardly of said plow beam, a co-acting plate having its inner end pivotally supported on said bolt on the upper face of said plow beam, the outer end of the last mentioned plate being secured to the outer end of the aforementioned plate and providing a means for connection to a draft appliance.

In testimony whereof I affix my signature.

J. CARL WILLIAMSON